United States Patent
Zhiglinsky et al.

[11] Patent Number: 5,418,804
[45] Date of Patent: May 23, 1995

[54] CONTROLLED SPECTRUM GENERATION LASER

[75] Inventors: Andrei G. Zhiglinsky; Alexander M. Izmailov, both of St. Petersburg, Russian Federation

[73] Assignee: American Biogenetic Sciences, Inc., Copiague, N.Y.

[21] Appl. No.: 180,401

[22] Filed: Jan. 11, 1994

[51] Int. Cl.$^6$ .................................. H01S 3/09
[52] U.S. Cl. .......................... 372/69; 372/66; 372/23; 372/101; 372/9; 372/51
[58] Field of Search ............ 372/23, 98, 70, 69, 372/9, 101, 66, 51

[56] References Cited

U.S. PATENT DOCUMENTS

| | | |
|---|---|---|
| 3,735,280 | 5/1973 | Johnston, Jr. . |
| 3,774,121 | 11/1973 | Ashkin et al. . |
| 3,928,817 | 12/1975 | Chodzko . |
| 3,993,963 | 11/1976 | Logan et al. . |
| 4,173,738 | 11/1979 | Boling et al. . |
| 4,287,486 | 9/1981 | Javan . |
| 4,494,235 | 1/1985 | Guch, Jr. et al. . |
| 4,502,144 | 2/1985 | Suhre . |
| 4,710,937 | 12/1987 | Oomori et al. . |
| 4,731,794 | 3/1988 | Schafer . |
| 4,759,026 | 7/1988 | Hollins et al. . |
| 4,821,280 | 4/1989 | Kawase . |
| 4,945,544 | 7/1990 | Tanaka et al. . |
| 5,131,002 | 7/1992 | Mooradian . |

FOREIGN PATENT DOCUMENTS

| | | |
|---|---|---|
| 1718313A1 | 7/1992 | Russian Federation . |
| 1778840A1 | 11/1992 | Russian Federation . |
| 1778841A1 | 11/1992 | Russian Federation . |

*Primary Examiner*—Léon Scott, Jr.
*Attorney, Agent, or Firm*—Pennie & Edmonds

[57] ABSTRACT

A controlled spectrum generation laser arrangement achieving greater uniformity in the optical power spectral distribution is realized by employing a matching plate that conforms the boundary interface of the active medium with the shape of the focal surface of the pump radiation. The matching plate ensures that for any portion of the active medium the pump radiation is focused at its boundary interface so as to achieve a uniform pump beam intensity.

20 Claims, 1 Drawing Sheet

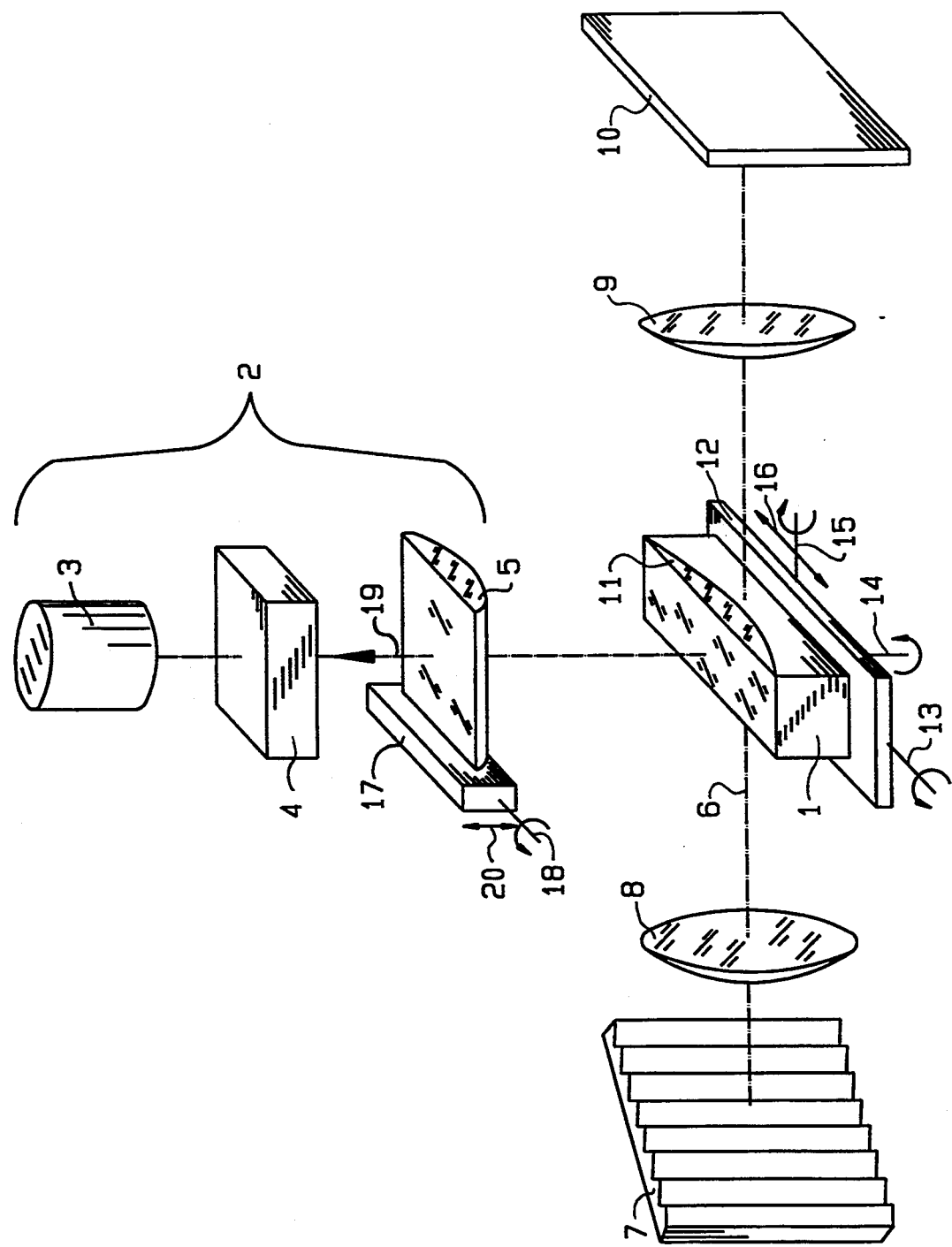

CONTROLLED SPECTRUM GENERATION LASER

Cross-Reference to Related Applications

This application is related to our co-pending U.S. patent application Ser. Nos. 08/180407 and 08/180408, which were filed concurrently herewith. The above-identified co-pending applications, which are commonly assigned, are incorporated herein by reference.

TECHNICAL FIELD

This invention relates to lasers, and more particularly to lasers having a polychromatic spectrum or a "white light" spectrum.

BACKGROUND OF THE INVENTION

Although conventional lasers emitting coherent radiation at a single wavelength have become indispensable research tools, for many applications there is still a need for a laser emitting simultaneously at a plurality of predetermined wavelengths or with a predetermined spectral composition. The realization of a polychromatic or white light laser provides novel approaches in numerous fields such as medicine, spectroscopy, holography, photo-chemistry, isotope separation, spectrum analysis, optical measurement, and/or ultra-short light pulse generation. In medicine, for example, white light lasers may be used to irradiate human organs with radiation whose spectrum is optimal with respect to the absorption characteristics of the organ under treatment.

Recently, controlled spectrum generation lasers capable of emitting polychromatic or white light radiation have been developed by the inventors. See, for example, the above-identified co-pending U.S. applications; and applicants' patent applications PCT/SU 89/00163, and SU 1718313 A1. Unlike conventional lasers, controlled spectrum generation lasers emit radiation at a plurality of desired wavelengths or of a continuous radiation spectrum with the required optical power spectral distribution.

In general, polychromatic or white light radiation is achieved by simultaneously pumping different portions of an active medium disposed within a suitable optical cavity or resonator. That is, the active medium is simultaneously pumped at different distances from the optical axis of the cavity, each portion of the active medium giving rise to the generation of radiation at a different wavelength. If the pumped portions are extended rather than discrete points, the white light radiation comprises segments of a continuous radiation spectrum. The number of wavelength components equals the number of sites pumped, while the linewidth of each generated wavelength or bandwidth of the continuous radiation spectrum segment depends on the size of the pump area if the pump beam is of sufficient intensity. The operation of the controlled spectrum generation laser is disclosed in more detail in the above-identified patent applications.

Despite its breakthrough success in achieving simultaneous multiwavelength or polychromatic lasing, the controlled spectrum generation laser has encountered new problems, some of which arise from the nature of simultaneously pumping different portions of the active medium. In this new class of lasers, a cylindrical lens is typically used to focus the pump radiation at the interface between the dye solution (active medium) and the cell wall. Unfortunately, unlike the dye solution and cell wall interface, the focal plane of the lens is usually not flat due to aberrations. See, for example, *Modem Optical Engineering* by Smith, McGraw-Hill, New York (1966); and *Principles of Optics* by Born and Wolf, Pergamon Press, New York (1975). As such, for portions of the active medium away from the optical axis, the pump radiation is not focused at the boundary interface of the active medium. Accordingly, the pump intensity at the dye solution and cell wall interface is not uniform, which in turns causes the optical power for radiation from off-axis portions of the active medium to differ from that produced from the portion on the optical axis. Moreover, the loss in optical power for off-axis radiation can unfortunately lead to the suppression of various longitudinal modes within the cavity.

It is therefore an object of the present invention to improve the uniformity of the pumping conditions for all off-axis portions of the active medium in the controlled spectrum generation lasers.

Further, because controlled spectrum generation lasers are pumped over a substantial portion of the active medium, any misalignment causes a significant reduction in the optical power efficiency. Accordingly, it is a further object of the present invention to facilitate the optimum positioning of the active medium with respect to both the pump radiation and the optical axis of the laser cavity.

SUMMARY OF THE INVENTION

A controlled spectrum generation laser arrangement achieving these and other objects is realized by employing a matching plate that conforms the boundary interface of the active medium with the shape of the focal surface of the pump radiation. The matching plate ensures that for any portion of the active medium the pump radiation is focused at its boundary interface so as to achieve a uniform pump beam intensity.

In an exemplary embodiment, the pump laser arrangement comprises a pump laser, an optical divider optically coupled to the pump laser, a cylindrical lens for focusing the radiation onto the active medium, a matching plate, and first and second drive mechanisms for positioning the cylindrical lens and active medium, respectively. More specifically, the pump beam is split into a plurality of beams by the optical divider and each beam is then focused by the cylindrical lens onto different portions of the active medium. Each portion of the active medium gives rise to the generation of radiation at a different wavelength. The matching plate is disposed on the active medium and has a surface with the shape of the focal surface of the cylindrical lens, which surface is in contact with the active medium. Advantageously, the matching plate displaces the active medium, typically a liquid solution, so as to conform the shape of the active medium boundary interface with that of the focal surface of the cylindrical lens. As a result, the pump radiation for any portion of the active medium is focused at the boundary interface of the active medium, resulting in a uniform pump intensity.

Drive mechanisms are used to align the position of the focal plane of the cylindrical lens with the surface of the matching plate that is in contact with the active medium. Preferably, the first drive mechanism is mounted against one side of the cylindrical lens for translating and rotating the cylindrical lens. The second drive mechanism similarly is mounted against one side of the active medium and is used to translate and rotate the active medium. The optical efficiency is substantially enhanced by appropriately aligning the active medium and cylindrical lens with respect to each other and the optical cavity.

BRIEF DESCRIPTION OF THE DRAWING

A more complete understanding of the present invention may be obtained by reading the following description of the specific illustrative embodiment of the invention in conjunction with the accompanying drawing. The accompanying drawing shows a simplified optical diagram of the controlled spectrum generation laser arrangement in accordance with the principles of the invention.

DETAILED DESCRIPTION OF THE INVENTION

Without any loss of generality or applicability for the principles of the invention, the following illustrative embodiment is described with respect to a polychromatic or white light laser cavity configuration substantially similar to that disclosed in patent application SU 1718313 A1. It should, however, be understood that the present invention may be used in other white light laser cavity configurations, such as those disclosed in applicants' above-identified co-pending U.S. patent applications.

As shown in the drawing, one illustrative controlled generation spectrum laser comprises an active medium 1 interposed within an optical cavity, and pump means 2. Active medium 1 has a characteristic index of refraction and is capable of amplifying the radiation wavelengths of interest. Preferably, active medium 1 is any of the well known liquid dye solutions that may be optically pumped to emit broadband spontaneous emission, such as a solution of organic dyes. For example, the dyes may include Rhodamine 6G, Rhodamine B, Coumarin 120 and/or Coumarin 153. See, *Introduction to Optical Electronics* by Yariv, Holt, Rinehart and Winston Publishers, New York (1976); and *Laser Guidebook* by Jeff Hecht, McGraw-Hill, New York (1992).

More specifically, the optical cavity comprises a dispersive element 7, an achromatic lens 8 positioned a focal length away from active medium 1, an achromatic lens 9 and a reflective element 10. Dispersive element 7 and reflective element 10 are preferably a diffraction grating and mirror, respectively. Active medium 1 is positioned within the optical cavity and centered along an optical axis 6 of the optical cavity. Achromatic lenses 8 and 9, dispersive element 7 and reflective element 10 are arranged relative to each other as shown in the drawing such that each generated wavelength is simultaneously amplified within the optical cavity by a different portion of active medium 1. The mechanism for simultaneously generating coherent radiation at more than one wavelength is discussed in greater detail below.

Pump means 2 comprises a pump laser 3, an optical divider 4, and a cylindrical lens 5. Pump laser 3 may be any of the well known pulsed lasers used for pumping an active medium, such as an excimer, nitrogen, solid-state, or copper vapor laser. See, *Laser Guidebook* by Jeff Hecht, McGraw-Hill, New York (1992). Further, optical divider 4 may be any optical device or arrangement which divides the pump radiation and deflects the divided pump radiation at different angles to cylindrical lens 5, such as an acoustic-optic deflector. Optical divider 4 may also comprise a system of mirrors or prisms. The use of acoustic-optic deflectors, mirrors and prisms to realize optical divider 4 is disclosed in our co-pending U.S. application Ser. No. 08/180407, entitled "Device For Pumping The Active Medium Of A White Light Laser," which is expressly incorporated herein by reference.

Those skilled in the art will recognize that pump means 2 is used to effect electron population inversion at different portions of active medium 1. As a result, each portion of active medium 1 gives rise to the generation of radiation at a characteristic wavelength.

In many applications, it is desirable to generate wavelength components of equal intensity so as to produce a uniform optical power spectral distributions. Since the lasing power for each wavelength component depends on the pump intensity at the corresponding pumped portion of the active medium, it is important in such applications to provide an identical pump beam intensity for different portions of active medium 1.

However, the diameter of cylindrical lens 5 is typically large, on the order of a few centimeters for focal lengths of 10–15 cm. For such a large physical size, the shape of the focal surface for cylindrical lens 5 deviates substantially from a plane surface. This deviation causes a significant difference between the lasing power generated by off-axis and on-axis portions of active medium 1.

To compensate for deviations of the focal surface of lens 5 from a plane surface, a matching plate 11 is positioned on the top surface of active medium 1. It is anticipated that matching plate 11 may be formed as the top wall of any cell that houses the active medium, typically a solution of organic dyes. Importantly, matching plate 11 is formed so that its surface contacting the active medium conforms the boundary interface to the shape of the focal surface of cylindrical lens 5. As a result, for any portion of active medium 1, the pump radiation is focused substantially at the boundary interface of the active medium.

Preferably the material of the matching plate 11 is selected so as to have approximately the same index of refraction as the active medium. For example, quartz or fluorite may be used as the plate material if the active medium is a solution of organic dyes dissolved in ethylene glycol, while crown or barite crown glass may be used as the plate material if the organic dyes are dissolved in a benzene or toluene solution.

The controlled spectrum generation laser arrangement further comprises first and second drive mechanisms. A first drive mechanism 17 is mounted against one side of cylindrical lens 5 and is used for the alignment thereof. A second drive mechanism 12 is similarly mounted to an underneath side of active medium 1 and used for its alignment. Each drive mechanism may be any of the translational and rotation devices well known in the art. Drive mechanism 12 allows active medium 1 to be rotated about three mutually perpendicular axes 13, 14 and 15; and to be translated along a direction 16 perpendicular to the propagation direction of the pump radiation. Further, drive mechanism 17 allows cylindrical lens 5 to be rotated about mutually perpendicular axes 18 and 19; and to be translated along direction 20, which is similarly parallel to the propagation direction of the pump radiation. Drive mechanisms 12 and 17 make it possible to align or make spatially coincident the focal surface of cylindrical lens 5 and the surface of matching plate 11 in contact with active medium 1.

In operation, polychromatic or white light radiation is realized by simultaneously pumping active medium 1 at different portions. A laser beam emitting from pump laser 3 is split into a plurality of beams by optical divider 4. The plurality of beams are then focused by cylindrical lens 5 onto different portions of active medium 1, each portion located at a different distance from optical axis 6 along the dispersive axis of dispersive element 7. The focal surface of cylindrical lens 5 is nominally positioned at the boundary interface of active medium 1.

Spontaneous emission from each pumped portion of active medium 1 is collimated by lens 8 and directed to dispersive element 7. The angle of incidence for each collimated beam is dependent on the spatial position of the origin of the radiation from active medium 1 and the focal length of lens 8. Dispersive element 7 diffracts the broadband spectrum collimated beams into their component wavelengths, each component propagating at an angle dependent on its wavelength and in accordance, for example, with the well known diffraction grating equation. See, *Principles of Optics* by Born and Wolf, Pergamon Press, New York (1975). For each collimated beam incident on dispersive element 7, only one wavelength component will be reflected back along the propagation direction of the collimated beam onto the corresponding pumped portion of active medium 1. This radiation is amplified and focused by lens 9 onto the surface of reflective element 10. Reflective element 10 redirects the radiation back through the optical cavity in the manner described above, resulting in lasing at a number of predetermined and independently tunable wavelengths. Should a second dispersive element, such as diffraction grating, be used as reflective element 10, lens 9 is appropriately positioned to collimate the radiation onto the second dispersive element.

Advantageously, matching plate 11 is disposed on the top surface of active medium 1 along the propagation direction of the pump radiation so as to conform the active medium interface to the shape of the focal surface of cylindrical lens 5. This is accomplished by displacing the active medium, which is typically a liquid dye solution, and forming a boundary interface with the shape of the focal surface of cylindrical lens 5.

Measurements from experimental practice indicate that the use of matching plate 11 in a controlled spectrum generation laser arrangement affords a higher and more uniform optical power spectral distribution. Further measurements from experimental practice indicate that there is a slight loss in the generated optical power if the index of refraction of matching plate 11 differs from that of active medium 1. This optical loss occurs because radiation that is reflected back from reflective element 10 is totally internally reflected by matching plate 11.

It is understood that various other modification will be readily apparent to those skilled in the an without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. A laser for generating light radiation having a plurality of spectral components, said laser comprising
    an active medium having a shape defined by a boundary interface,
    means for pumping different portions of said active medium, said means for pumping including a lens for focusing pump radiation along a focal surface of said lens, said focal surface having a predetermined shape,
    a resonant cavity with said active medium disposed therein, said resonant cavity providing optical feedback for each of said spectral components through a corresponding portion of said active medium so as to generate said light radiation having a plurality of spectral components and
    means for conforming said shape of said boundary interface of said active medium to the predetermined shape of said focal surface such that said pump radiation is focused at said boundary interface.

2. The optical apparatus of claim 1 wherein said means for conforming includes a matching plate disposed on said active medium.

3. The optical apparatus of claim 2 wherein said matching plate includes a surface in contact with said active medium thereby forming said boundary interface.

4. The optical apparatus of claim 3 wherein said surface of said matching plate has the shape of said focal surface.

5. The optical apparatus of claim 1 wherein said focal surface and said boundary interface are spatially coincident.

6. The optical apparatus of claim 1 wherein said lens is a cylindrical lens.

7. The optical apparatus of claim 1 wherein said matching plate and said active medium have substantially the same indices of refraction.

8. The optical apparatus of claim 1 wherein said means for pumping includes a pulsed laser.

9. The optical apparatus of claim 1 wherein said active medium includes a liquid solution of organic dyes.

10. The optical apparatus of claim 1 further comprising first and second means for positioning said active medium and said lens with respect to each other.

11. The optical apparatus of claim 1 wherein said means for pumping includes an acoustic-optic deflector.

12. An optical apparatus comprising
    a laser for generating white light radiation, said laser including a liquid active medium,
    means for generating a pump radiation,
    means for splitting said pump radiation into a plurality of pump beams,
    means for focusing each of said pump beams onto a different portion of said active medium, said means for focusing having a focal surface to which said pump beams are focused, and
    a matching plate having a surface in contact with said active medium, said surface having a shape of said focal surface, said matching plate displacing a portion of said liquid active medium in contact with said surface of said matching plate so as to form a boundary interface substantially having the shape of said focal surface.

13. The optical apparatus of claim 12 wherein said means for focusing includes a cylindrical lens.

14. The optical apparatus of claim 13 wherein said matching plate and said active medium have substantially the same refractive indices.

15. The optical apparatus of claim 12 wherein said means for generating a pump radiation includes a pulsed laser.

16. The optical apparatus of claim 12 wherein said liquid active medium includes organic dyes.

17. The optical apparatus of claim 10 further comprising first and second means for positioning said active medium and means for focusing with respect to each other so as to position said focal surface to be spatially coincident with said boundary interface.

18. The optical apparatus of claim 12 wherein said means for splitting said pump radiation includes an acoustic-optic deflector.

19. A method of pumping different portions the active medium of a laser, said active medium having a boundary interface, and said method comprising the steps of:

generating a pump radiation;

selectively focusing said pump radiation along a focal surface to pump a portion of said active medium to generate radiation at a desired wavelength; and conforming the boundary interface of said active medium to match the shape of said focal surface.

20. The method of claim 19 further comprising the step of:

positioning said boundary interface to be spatially coincident with said focal surface.

* * * * *